May 8, 1923.
C. H. SUMMERILL
BURGLAR ALARM FOR AUTOMOBILES
Filed Nov. 1, 1922
1,454,795
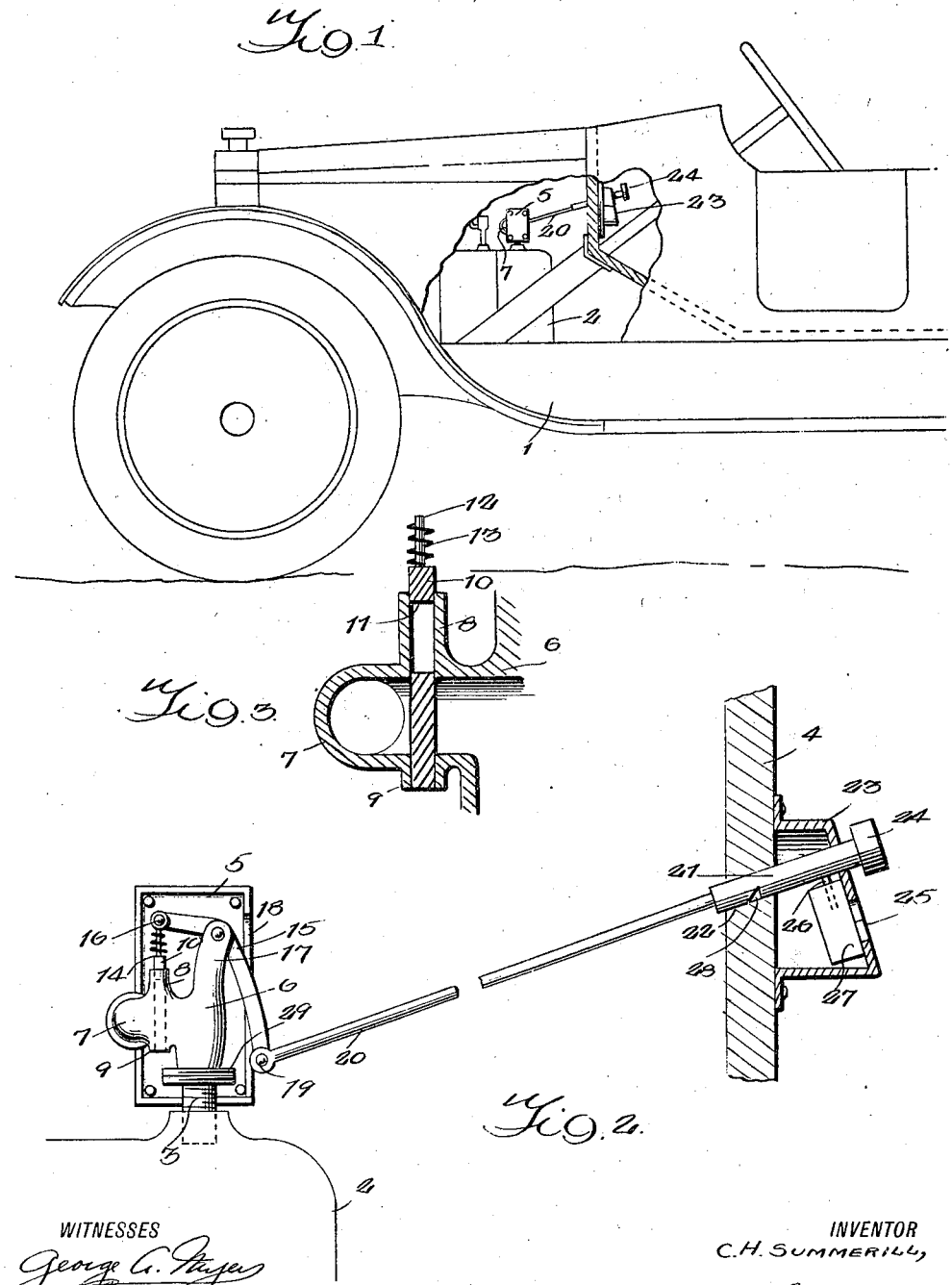
WITNESSES
George C. Hayes
INVENTOR
C. H. SUMMERILL,
BY
ATTORNEYS Patented May 8, 1923.

1,454,795

UNITED STATES PATENT OFFICE.

CHARLES H. SUMMERILL, OF PENNS GROVE, NEW JERSEY.

BURGLAR ALARM FOR AUTOMOBILES.

Application filed November 1, 1922. Serial No. 598,338.

*To all whom it may concern:*

Be it known that I, CHARLES H. SUM-MERILL, a citizen of the United States, and a resident of Penns Grove, in the county of Salem and State of New Jersey, have invented certain new and useful Improvements in Burglar Alarms for Automobiles, of which the following is a specification.

This invention relates to burglar alarms for automobiles.

An object of this invention is the provision of an audible signal connected with some part of the automobile engine through which a fluid under pressure is adapted to pass when the engine is operated by an unauthorized person whereby the fluid will operate the signal and warn the public and the police of the unauthorized operation of the automobile.

A further object of the invention is the provision of an audible signal connected in such a manner with an automobile engine whereby the signal is operated through fluid pressure from the engine. Means are included in the device for maintaining the connection between the engine and signal in open position with a lock for preventing unauthorized manipulation of said means.

Other objects and advantages of the invention will be apparent during the course of the following description.

In the accompanying drawings forming a part of this specification, and in which like reference numerals designate like parts throughout the same, Figure 1 is a side view of an automobile showing my invention in operative relation on the block of the automobile engine.

Figure 2 is an enlarged detail view of the burglar alarm.

Figure 3 is a vertical section of the conduit and valve which controls the fluid under pressure which operates the alarm.

Referring to the drawings, 1 designates an automobile provided with an engine 2, a pet cock nipple 3, and a dash 4. The nipple 3 is screwed into the opening in the cylinder block which is adapted to receive the usual pet cock. The nipple is located directly over the exhaust valve of an engine cylinder.

Rigidly connected with the nipple 3 is a casing 5 in which is mounted a siren or audible signal 6. A conduit 7 which passes outwardly through the casing 5 produces an exhaust for the gases under pressure which are admitted to the signal 6 from the engine cylinder.

The conduit 7 is provided with diametrically disposed bosses 8 and 9 in which is slidably mounted a valve 10 having an opening 11 adapted to aline with the central passage in the conduit 7 whereby exhaust gases passing through the siren 6 will be exhausted through the passage 11 and the conduit 7.

The valve 10 is provided with a stem 12 upon which is mounted a spring 13. The spring at one end engages a shoulder 14 on the valve 10 and at its other end the outer end of a bell crank lever 15, the outer end of the bell crank lever being pivoted at 16 to the upper end of the stem 12.

The audible signal 6 is provided with a bracket arm 17 on which the bell crank lever is pivotally mounted intermediate its ends. The other end of the lever 15 projects through a slot 18 of the casing 5 and is pivotally connected at 19 to an operating rod 20. Connected to the outer free end of the rod 20 is a manipulating handle 21 which is slidable through a passage 22 in the dash 4 and through a perforation in the lock casing 23, the knob 24 of the handle 21 being located without the lock 23.

The casing 23 is provided with an opening 25 for the insertion of a key for manipulating the bolt 26 of the lock 27. The manipulating handle 21 is provided with a notch 28 and is movable in a path whereby the bolt 26 will automatically engage the notch when the handle 21 is pulled sufficiently outward of the lock casing 23. The lock bolt 26 is adapted to be in engagement with the handle 21 so that as the handle is moved outwardly of the casing 23 the bolt will automatically engage the notch 28.

The audible signal 6 is connected to the nipple 3 by means of cooperating flanges 29. The bolts which secure the cover to the casing 5 may be protected against unauthorized manipulation in any suitable manner. The casing 5 which encloses the signal 6 is located as close to the block 2 of the engine as is possible in order to prevent removal of the casing.

The operation of my device is as follows:

When the operating handle 21 is moved outwardly of the casing 23 sufficiently to permit the lock bolt 26 to engage the notch 28, the rod 20 will be automatically locked in position against unauthorized manipulation. When the rod 20 is so positioned the valve 10 will have been moved downwardly so that the passage 11 of said valve will aline with the passage in the conduit 7 and permit exhaust gases from the engine cylinder to enter the audible signal 6 and operate said signal to attract attention of the public or of the police.

Before starting the engine the authorized operator will unlock the rod 21 and move the same inwardly for closing the conduit 7 from the exhaust and thereby preventing operation of the signal.

It is to be understood that while I have shown the audible signal connected to the engine block through the usual pet cock opening, the same may be directly connected with one of the spark plugs.

What I claim is:—

1. In an alarm adapted to be connected with one of the cylinders of the engine block of an automobile engine, the combination with an audible signal, a conduit connecting the signal with an engine cylinder for transmitting fluid pressure from the engine cylinder to said signal, an exhaust conduit for the signal, a valve in said conduit controlling the flow of the fluid through the signal, a rod operatively connected with the valve, a lock secured in fixed relation upon the dash of an automobile and provided with a passage extending through the lock, a manipulating handle connected with the rod and slidable through the passage in the lock, and in engagement with the bolt of the lock, said handle being provided with a notch adapted to engage the lock bolt when said handle has been manipulated for causing the valve to open communication between the signal and the atmosphere.

2. In a burglar alarm adapted to be connected with one of the cylinders of the engine block of an automobile engine, the combination with a casing rigidly connected with an engine cylinder, an audible signal mounted within the casing, a conduit passing through the casing and connecting the audible signal with the atmosphere for exhausting fluid pressure from said signal, a valve in the conduit controlling the exhaust of the fluid from the audible signal, a bell crank lever mounted on the audible signal and connected at one end with the valve, a rod connected at one end to the other end of the bell crank lever, a manipulating handle connected with the other end of the rod, a lock secured in fixed relation upon the dash of an automobile and provided with a passage extending through the lock, said manipulating handle being provided with a notch and slidable in the passage with its free end projecting outwardly from the lock, said notch adapted to engage the lock bolt of said lock when the handle has been moved outwardly from the lock for operating the valve to cause communication between the atmosphere and the audible signal.

3. In a burglar alarm adapted to be connected with the engine cylinder of an automobile engine, the combination with an audible signal adapted to be operated by fluid under pressure, a conduit connecting the signal with a cylinder of the engine for transmitting fluid under pressure through said audible signal, an exhaust conduit connecting the signal with the atmosphere, diametrically disposed bosses on the exhaust conduit and provided with alined passages in the bosses, a plate forming a valve slidably mounted in the alined passages, a passage in said plate adapted to aline with the passage in the exhaust conduit, a rod for operating said valve to open or closed position, the other end of the rod being remotely located from the audible signal, a lock provided with a passage adapted to receive the remotely located end of the rod, said rod being slidable through the passage in the lock and provided with a notch adapted to automatically engage the lock bolt of said lock whereby the plate will be locked in a predetermined position with the passage in said plate alining the passage in the exhaust conduit, whereby fluid pressure from the engine cylinder will operate the audible signal.

CHARLES H. SUMMERILL.